United States Patent
Gardiner et al.

(10) Patent No.: US 8,958,004 B2
(45) Date of Patent: Feb. 17, 2015

(54) CAMERA-BASED ORIENTATION FIX FROM PORTRAIT TO LANDSCAPE

(71) Applicant: Apple Inc., Cupertino, CA (US)

(72) Inventors: Koji Gardiner, San Francisco, CA (US); E-Cheng Chang, San Jose, CA (US); Jason Rukes, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/071,218

(22) Filed: Nov. 4, 2013

(65) Prior Publication Data

US 2014/0055658 A1 Feb. 27, 2014

Related U.S. Application Data

(63) Continuation of application No. 12/877,821, filed on Sep. 8, 2010, now Pat. No. 8,593,558.

(51) Int. Cl.
*H04N 5/222* (2006.01)
*H04N 5/232* (2006.01)
*G06F 1/16* (2006.01)
*G06F 3/01* (2006.01)
*G06F 3/0346* (2013.01)
*H04N 5/228* (2006.01)

(52) U.S. Cl.
CPC .......... *H04N 5/23293* (2013.01); *G06F 1/1626* (2013.01); *G06F 3/012* (2013.01); *G06F 3/0346* (2013.01); *G06F 2200/1614* (2013.01); *G06F 2200/1637* (2013.01)
USPC ..................... 348/333.12; 348/208.2; 348/191

(58) Field of Classification Search
CPC ............ H04N 5/23293; H04N 5/2228; H04N 2101/00; H04N 1/2112; H04N 5/232
USPC ......... 348/14.07, 191, 208.2, 333.01, 333.03, 348/333.12
See application file for complete search history.

(56) References Cited

U.S. PATENT DOCUMENTS

| | | | |
|---|---|---|---|
| 7,054,552 B2 | 5/2006 | Konttinen | |
| 7,471,328 B2 | 12/2008 | Kim et al. | |
| 7,593,627 B2 | 9/2009 | Wernersson | |
| 7,742,783 B2 | 6/2010 | Duarte | |

(Continued)

FOREIGN PATENT DOCUMENTS

| EP | 2083276 A1 | 7/2009 |
|---|---|---|
| EP | 2280331 A1 | 2/2011 |

(Continued)

OTHER PUBLICATIONS

NL Search Report (dated Mar. 23, 2012), Application No. 2007365, date filed—Sep. 7, 2011, 12 pages.

(Continued)

*Primary Examiner* — Hung Lam
(74) *Attorney, Agent, or Firm* — Kenyon & Kenyon, LLP

(57) ABSTRACT

A portable electronic device includes a camera and a display switchable between a portrait mode and a landscape mode in response to an inertial sensor. When it is determined that the display mode should be switched in response to movement of the device, a feature of a user of the device, such as the user's face, is imaged with the camera. If the imaged feature changes orientation with respect to the display by less than a threshold amount, then the switch in display mode is disabled and the display remains in its current mode. Other embodiments are also described and claimed.

34 Claims, 3 Drawing Sheets

(56) References Cited

U.S. PATENT DOCUMENTS

| | | | |
|---|---|---|---|
| 8,068,121 | B2 | 11/2011 | Williamson et al. |
| 8,451,296 | B2 * | 5/2013 | Ono .............................. 345/649 |
| 8,553,129 | B2 * | 10/2013 | Huang et al. ............. 348/333.05 |
| 2002/0033836 | A1 | 3/2002 | Smith |
| 2003/0016883 | A1 | 1/2003 | Baron |
| 2004/0017506 | A1 | 1/2004 | Livingston |
| 2004/0201595 | A1 | 10/2004 | Manchester |
| 2005/0044510 | A1 | 2/2005 | Yi |
| 2005/0088536 | A1 | 4/2005 | Ikeda |
| 2005/0104848 | A1 | 5/2005 | Yamaguchi et al. |
| 2005/0108646 | A1 | 5/2005 | Willins et al. |
| 2005/0156882 | A1 | 7/2005 | Manchester |
| 2006/0044268 | A1 | 3/2006 | Robin et al. |
| 2006/0222264 | A1 | 10/2006 | Guitarte Perez et al. |
| 2007/0296820 | A1 | 12/2007 | Lonn |
| 2008/0239131 | A1 | 10/2008 | Thorn |
| 2009/0009469 | A1 | 1/2009 | Hsu et al. |
| 2010/0066667 | A1 | 3/2010 | MacDougall et al. |
| 2010/0129068 | A1 | 5/2010 | Binda et al. |
| 2011/0032220 | A1 * | 2/2011 | Shih et al. ..................... 345/204 |
| 2011/0037866 | A1 * | 2/2011 | Iwamoto ................... 348/222.1 |

FOREIGN PATENT DOCUMENTS

| | | |
|---|---|---|
| JP | 2011-203860 | 10/2011 |
| TW | 201025993 A | 7/2010 |
| WO | 2010030985 A1 | 3/2010 |

OTHER PUBLICATIONS

EP Search Report (dated Jun. 3, 2012) Mar. 6, 2012, Application No, 11179869.0, Date Filed—Sep. 2, 2011, 9 pages.

PCT International search report and Written Opinion (dated Jan. 17, 2012), International Application PCT/US11/50249, International Filing Date—Sep. 1, 2011, Applicant—Apple, Inc., 10 pages.

GB Combined Search and Examination Report (dated Dec. 14, 2011), Application No. BG1115165.1, Date Filed Sep. 2, 2011, 8 pages.

TW Office Action issued in TW Application No. 100132307, dated Jan. 14, 2014, 10 pages (with English translation).

CN Office Action issued in CN Application No. 201110319153.9, dated Apr. 28, 2014, 9 pages (with English translation).

EP Office Action issued in EP Application No. 11179869.0, dated Feb. 20, 2013, 5 pages.

JP Office Action issued in JP Application No. 2011-211537, dated Aug. 23, 2012, 4 pages (with English translation).

JP Office Action issued in JP Application No. 2011-211537, dated Mar. 14, 2013, 3 pages.

KR Office Action issued in KR Application No. 10-201190677, dated Mar. 21, 2013, 7 pages (with English translation).

KR Office Action issued in KR Application No. 10-201190677, dated Dec. 30, 2013, 4 pages (with English translation).

* cited by examiner

_US 8,958,004 B2_

CAMERA-BASED ORIENTATION FIX FROM PORTRAIT TO LANDSCAPE

CROSS REFERENCE TO RELATED APPLICATION

This application is a continuation of, and claims priority to, U.S. patent application Ser. No. 12/877,821, filed on Sep. 8, 2010, which is hereby incorporated by reference in its entirety.

BACKGROUND

1. Field

The invention relates generally to the field of displays for portable handheld electronic devices and, more particularly, to a display that is switched between portrait and landscape modes as a function of a sensed orientation of the user.

2. Background

Portable data and media display devices, such as mobile telephones, e-book readers, tablet computers and the like typically have rectangular display screens with a "portrait" orientation. It is often desirable to view content in a "landscape" orientation. This can be accomplished by rotating the display screen by 90° and selecting a landscape presentation (or landscape display mode). A manual selection may be provided, but many devices now have inertial sensors to automatically select a landscape presentation when rotation of the device is sensed.

In some situations, the user of a portable device may not want the display mode to change when the device is rotated. For example, a user may start reading email messages or playing a game while sitting upright, but may then decide to lie down while continuing to use the device. The user does not want the display mode to change in such a situation because the relative orientation of the user's eyes with respect to the display screen has not changed. While a manual display mode selection may be provided to override the inertial sensor, this is an inconvenient solution to the problem.

SUMMARY

An embodiment of the present invention is a mode of operation in a portable electronic device, for stabilizing the display of the device with respect to the user's face. The portable electronic device has a camera and a display screen for which the display mode is switchable between a portrait mode and a landscape mode in response to an inertial sensor. When it is determined that the display mode should be switched in response to movement of the device, a feature of a user of the device, such as the user's face, is imaged with the camera. If the imaged feature changes orientation with respect to the device by less than a threshold amount, then the switch in display mode is disabled so that the display mode remains in its current mode.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of embodiments of the present invention.

Figure 1A:
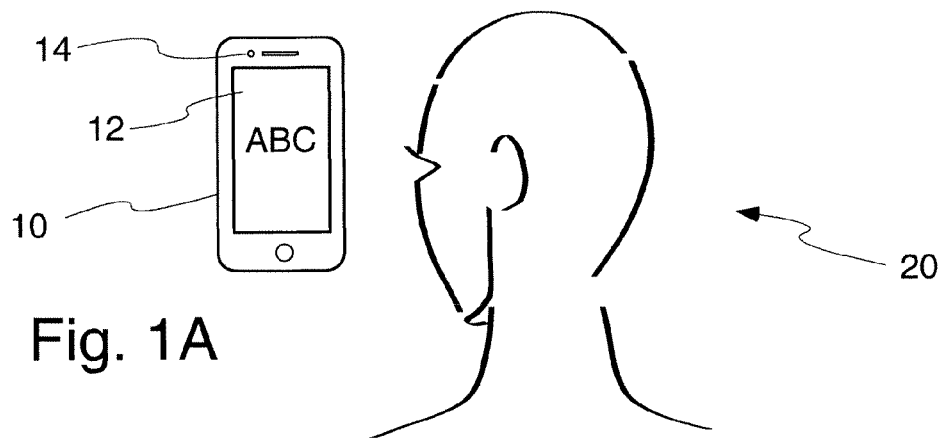
FIGS. 1A-1C illustrate a device with portrait and landscape display modes selected in accordance with an embodiment of the present invention.
Figure 1B:
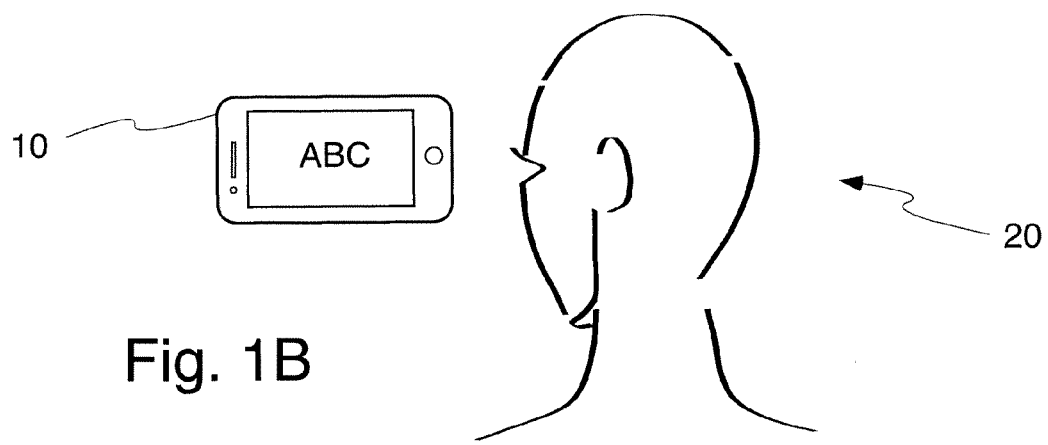

Portable handheld electronic devices, such as the iPod™ and iPhone™ multifunction devices by Apple Inc., have a display screen for viewing photos, videos, documents, web content and other media. A device of this type, denoted as 10, is shown in FIG. 1A. The display screen 12 is typically configured with a height greater than the width in the normal orientation of the device so that objects on the screen are said to be displayed in "portrait" display mode as shown in FIG. 1A. While the device 10 is being held in this orientation, the text and other content is displayed horizontally which is consistent with the horizontal orientation of user 20's eyes. Device 10, as is the case with many similar devices, has a built-in accelerometer or similar inertial sensor to detect the movement and orientation of the device. With this capability and suitable display software, the device may be rotated 90°, and objects on the display screen will then be presented in "landscape" display mode as shown in FIG. 1B. Text and other content remains displayed horizontally.

Figure 1C:
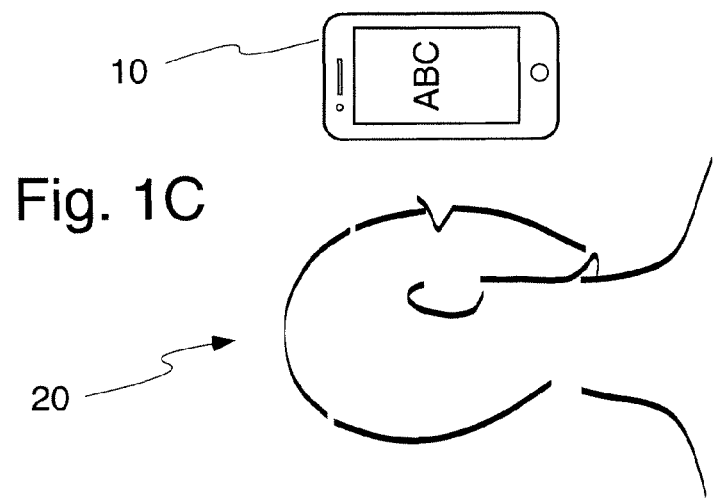

Referring again to FIG. 1A, device 10 includes a built-in front-facing digital camera 14. The imaging lens 110 (see FIG. 3) of the camera 14 is aimed out of the front face of the device 10, in which the display screen 12 is located. As will be more fully explained below, camera 14 is used to capture an image of the device user 20 while the user is facing the display screen 12, in order to override the usual selection of the portrait or landscape display mode in certain situations. As seen in FIG. 1B, the selection of the landscape mode upon rotation of the device 10 by 90° is appropriate for the orientation of user 20. In FIG. 1C, however, the user is reclining and the user's eyes are now oriented along a generally vertical line as opposed to the horizontal orientation in FIGS. 1A and 1B. Here, it is appropriate to maintain the display in the portrait mode even though device 10 has been rotated 90° as compared to FIG. 1A since the displayed text and other content will remain properly oriented with respect to the user's eyes.

Figure 2:
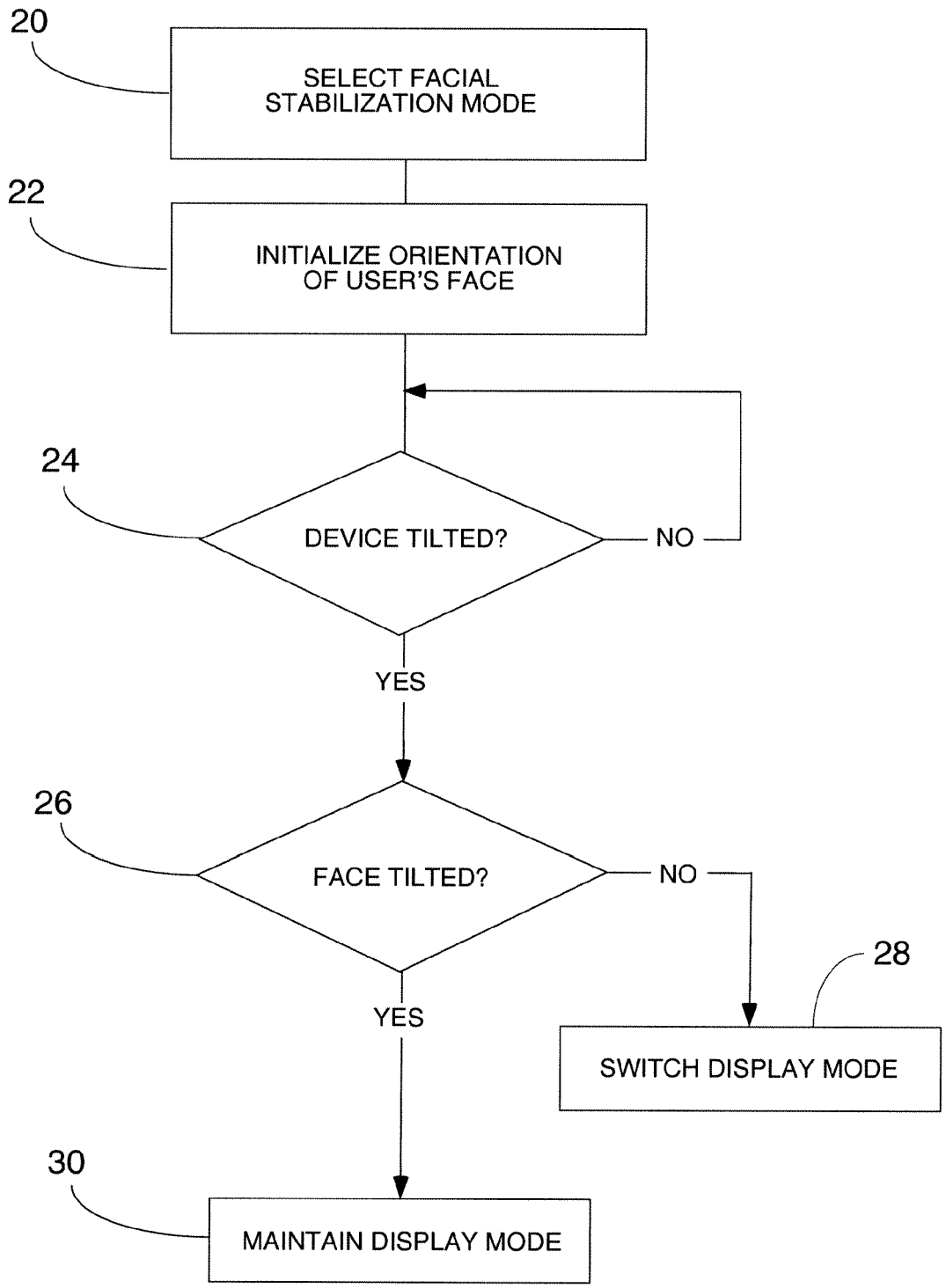
FIG. 2 is a functional flow diagram of a display mode selection process in accordance with an embodiment of the present invention.

A process for implementing an embodiment of the present invention is shown in FIG. 2. The process can be performed by a suitably programmed processor in the device 10 (e.g., an applications processor). The process begins with user selection of a mode of operation of the portable device that stabilizes the display with respect to the user's face at 20. This may be accomplished with a menu selection, by launching a special purpose application, by depressing a manual switch or by other means known to those skilled in the art. The process may be automatically selected in certain applications. An image of the user's face is captured with the front-facing camera 14 and is then analyzed at 22 to establish a starting reference for the user's orientation. This may be done, for example, by determining the orientation of a line passing through the user's eyes in the plane of the image, relative to the orientation of the portable device (e.g., its display screen) at that time. The latter may be considered to be the reference orientation of the device and can be determined using an inertial sensor (e.g., an accelerometer, a multi-axis turn rate gyro) in the device, in accordance with known techniques. Facial analysis algorithms suitable for the purposes of this invention, including recognizing the user's eyes in the image, are also known to those skilled in the art. For example, the iPhoto™ application by Apple Inc. uses facial detection to identify faces of people in photographs. For instance, the relative orientation (user's eyes relative to display screen) may be as in FIG. 1A and may be stored as the angle computed between a straight line crossing the user's eyes in the captured image, and the X-axis of the camera's image sensor.

The device's accelerometer or other integrated inertial sensor is monitored at 24 to determine when the device 10 has been tilted sufficiently to otherwise trigger a switch of the display mode from portrait to landscape or vice versa. This may be an entirely conventional operation. If a tilt is detected in such operation, an image of the user's face captured with the front-facing camera at that point is again analyzed at 26 to determine if the user's orientation has likewise changed. If the orientation of the device has tilted without a corresponding change in the user's orientation, then the display mode is switched at 28. On the other hand, if the user's orientation has also changed such that the user's face remains in approximately the same orientation relative to the display screen, then the current display mode is maintained at 30. In other words, if the image feature of the user's face changes orientation with respect to the device's orientation by less than a threshold amount (e.g., a predetermined angle such as 45°), then the switching of the display mode is disabled. Thus, in the example above, if the line crossing the user's eyes remains within 45° of the image sensor's X-axis, then the user's orientation has not changed enough to allow the display mode to be switched. Multiple images of the user, which may be captured by the same camera 14 as the device 10 is tilted from one orientation to another (e.g., horizontal to vertical or vice versa), may be analyzed to make the determination as to how much the user's feature changes its orientation.

Figure 3:
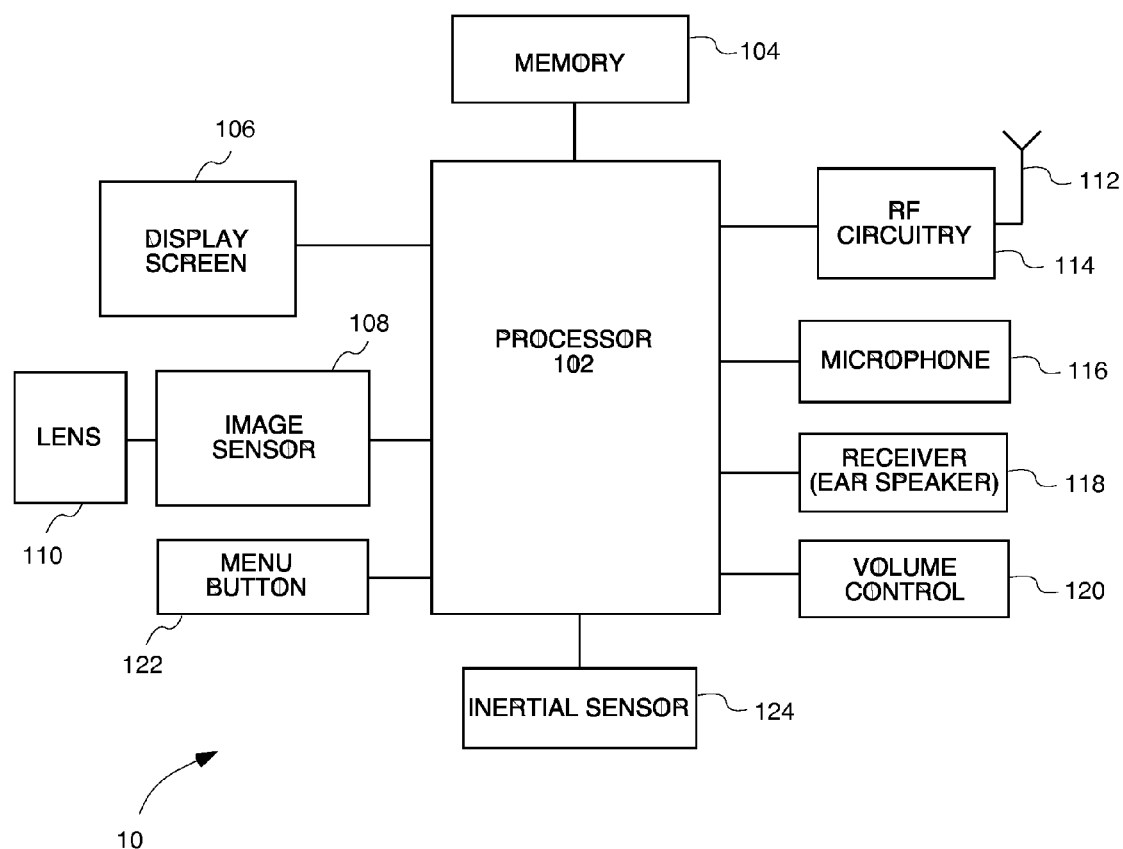
FIG. 3 is a functional block diagram of an electronic device in which embodiments of the present invention may be practiced.

FIG. 3 depicts a block diagram of an exemplary portable handheld multifunction device 10 in which an embodiment of the invention may be implemented. The device 10 has a processor 102 that executes instructions to carry out operations associated with the device 10. The instructions may be retrieved from memory 104 and, when executed, control the reception and manipulation of input and output data between various components of device 10. Although not shown, the memory 104 may store an operating system program that is executed by the processor 102, and one or more application programs are said to run on top of the operating system to perform specific functions. The display screen 106 displays a graphical user interface (GUI) that allows a user of the device 10 to interact with various application programs running in the device 10. The GUI displays icons or graphical images that represent application programs, files, and their associated commands on the screen 106. These may include windows, fields, dialog boxes, menus, buttons, cursors, scrollbars, etc. The user can select from these graphical images or objects to initiate the functions associated therewith.

In one embodiment, the screen 106 is a touch screen that also acts as an input device to transfer data from the outside world into the device 10. This input is received via, for example, the user's finger touching the surface of the screen 106, but it may also be received via physical buttons on the device 10.

Camera functionality of the device 10 (or camera 14, see FIG. 1) may be enabled by the following components. One or more solid state image sensors 108 are built into the device 10 and each may be located at a focal plane of an optical system that includes a respective lens 110. An optical image of a scene within the camera's field of view is formed on the image sensor 108, and the sensor 108 responds by capturing the scene in the form of a digital image or picture consisting of pixels that will then be stored in memory 104. The image sensor 108 may include a solid state image sensor chip with several options available for controlling how an image is captured.

The device 10 may operate not just in a digital camera mode, but also in mobile voice and/or data telecommunications modes. These are enabled by the following components. An integrated antenna 112 that is driven and sensed by RF circuitry 114 is used to transmit and receive cellular network communication signals from a nearby base station (not shown). A mobile phone application executed by the processor 102 presents mobile telephony options on the screen 106 for the user, such as a virtual telephone keypad with call and end buttons. The mobile phone application also controls at a high level the two-way conversation in a typical mobile telephone call, by directing a speech signal from the built-in microphone 116 to the RF circuitry, while at the same time directing a speech signal from the other side of the conversation through the receiver or ear speaker 118. The mobile phone application also responds to the user's selection of the receiver volume, by detecting actuation of a physical volume control 120. Although not shown, the processor 102 may include a cellular base band processor that is responsible for much of the digital audio signal processing functions and cellular network protocol signaling associated with a cellular phone call, including encoding and decoding the voice signals of the participants to the conversation. Likewise, processor 102 may include a data communications processor that is responsible for encoding and decoding, and/or packetization and depacketization of data, for transmission and reception over one or more wireless data networks.

The device 10 may be placed in any of its available modes of operation, such as a mobile telephone mode, a digital camera mode or a web browsing mode, in response to, for example, the user actuating a physical menu button 122 and then selecting an appropriate icon on the display device of the screen 106. Any of various application programs stored in memory 104 may be similarly selected by the user.

The device 10 includes an inertial sensor 124 such as an accelerometer, which may be a three-dimensional accelerometer that detects acceleration in three axial directions of the device 10, i.e. the up-down direction (Y-axis), the left-right direction (X-axis), and the front-rear direction (the Z-axis). The accelerometer allows the inclinations and movements of the device 10 in the X-axis, Y-axis and Z-axis directions to be determined. In an alternative embodiment, a rate gyro may be employed that detects rotation of the device 10 about the Z-axis. Acceleration or turn rate data detected by the sensor 124 is transmitted to the processor 102 for processing to enable determination of the position, orientation, and/or movement of the device 10. This information may then be processed to select between portrait and landscape display modes when the orientation of device 10 reaches predetermined limits.

It will be apparent from this description that aspects of the present invention may be embodied, at least in part, in software, hardware, firmware, or in combination thereof. That is, the techniques may be carried out in a computer system or other data processing system in response to its processor, such as a microprocessor, executing sequences of instructions contained in a memory, such as ROM, volatile RAM, non-volatile memory, cache, or a remote storage device. In various embodiments, hardwired circuitry may be used in combination with software instructions to implement the present invention. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize that what is meant by such expressions is that the functions result from execution of code by a processor, such as a microprocessor.

A machine-readable medium can be used to store software and data which when executed by the data processing system causes the system to perform various methods of the present invention. This executable software and data may be stored in various places including for example ROM, volatile RAM, non-volatile memory, and/or cache. Portions of this software and/or data may be stored in any one of these storage devices.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media such as, but not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

Additionally, it will be understood that the various embodiments described herein may be implemented with a variety of data processing systems. For example, such data processing systems may be a cellular telephone or a personal digital assistant (PDA) or an entertainment system or a media player (e.g., an iPod) or a consumer electronic device, etc., each of which can be used to implement one or more of the embodiments of the invention.

Throughout the foregoing specification, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to bring about such a feature, structure, or characteristic in connection with other embodiments whether or not explicitly described. Various changes may be made in the structure and embodiments shown herein without departing from the principles of the invention. Further, features of the embodiments shown in various figures may be employed in combination with embodiments shown in other figures.

In the description as set forth above and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed description as set forth above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion as set forth above, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer system or other apparatus. Various general purpose systems may be used with programs in accordance with the teachings herein, or it may prove convenient to construct more specialized apparatuses to perform the method operations. The structure for a variety of these systems appears from the description above. In addition, the invention is not described with reference to any particular programming language. It will be appreciated that a variety of programming languages may be used to implement the teachings of the invention as described herein.

Embodiments of the invention may include various operations as set forth above or fewer operations or more operations or operations in an order that is different from the order described herein. The operations may be embodied in machine-executable instructions that cause a general-purpose or special-purpose processor to perform certain operations. Alternatively, these operations may be performed by specific hardware components that contain hardwired logic for performing the operations, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims that follow as well as the legal equivalents thereof.

What is claimed is:

1. A method for use in a portable electronic device having a camera, an inertial sensor, a processor and a display screen, the method comprising:
   detecting, by the inertial sensor, movement of the device;
   analyzing, by the processor in response to the detecting of the movement, a first image captured by the camera to determine an orientation of a feature of a user of the device relative to an axis of the device;
   comparing the determined orientation of the user feature to an orientation of the user feature determined by analyzing a second image captured by the camera before the detecting of the movement of the device; and
   displaying, by the display screen, a user interface in a display mode selected from at least one of a landscape mode or a portrait mode based on the comparing.

2. The method of claim 1, wherein the analyzing includes determining an orientation of a line connecting eyes of the user in the first image.

3. The method of claim 2, wherein the determined orientation of the line is an angle of the line relative to the axis of the device.

4. The method of claim 1, further comprising detecting at least one of a face of the user or eyes of the user in the first image.

5. The method of claim 1, wherein the displaying includes maintaining, after the detecting of the movement, a display mode existing immediately prior to the detected movement if the determined orientation changes in comparison to the orientation of the user feature determined by analyzing the second image captured by the camera before the detecting of the movement by less than a threshold amount.

6. The method of claim 1, wherein the displaying includes switching, after the detecting of the movement, a display mode existing immediately prior to the detected movement if the determined orientation changes in comparison to the orientation of the user feature determined by analyzing the second image captured by the camera before the detecting of the movement by more than a threshold amount.

7. The method of claim 1, further comprising receiving a selection of a facial-stabilization mode of operation of the device.

8. The method of claim 1, further comprising capturing the first image in response to the detecting of the movement of the device.

9. The method of claim 1, further comprising capturing the second image after and as a function of selecting a facial stabilizing mode of the portable electronic device.

10. The method of claim 1, wherein the capturing of the second image occurs automatically.

11. A portable electronic device, comprising:
    a camera;
    an inertial sensor;
    a display; and
    a processor, wherein the processor is configured to control the camera, inertial sensor, and display to:
      detect, by the inertial sensor, movement of the device;
      analyze, by the processor in response to the detecting of the movement, a first image captured by the camera to determine an orientation of a feature of a user of the device relative to an axis of the device;
      compare the determined orientation of the user feature to an orientation of the user feature determined by analyzing a second image captured by the camera before the detecting of the movement of the device; and
      display, by the display screen, a user interface in a display mode selected from at least one of a landscape mode or a portrait mode based on the comparing.

12. The portable electronic device of claim 11, wherein the analyzing includes determining an orientation of a line connecting eyes of the user in the first image.

13. The portable electronic device of claim 12, wherein the determined orientation of the line is an angle of the line relative to the axis of the device.

14. The portable electronic device of claim 11, further comprising detecting at least one of a face of the user or eyes of the user in the first image.

15. The portable electronic device of claim 11, wherein the displaying includes maintaining, after the detecting of the movement, a display mode existing immediately prior to the detected movement if the determined orientation changes in comparison to the orientation of the user feature determined by analyzing the second image captured by the camera before the detecting of the movement by less than a threshold amount.

16. The portable electronic device of claim 11, wherein the displaying includes switching, after the detecting of the movement the device, a display mode existing immediately prior to the detected movement if the determined orientation changes in comparison to the orientation of the user feature determined by analyzing the second image captured by the camera before the detecting of the movement by more than a threshold amount.

17. A non-transitory storage medium having program instructions, which when executed by a processor perform a method for use in a portable electronic device having a camera, an inertial sensor, the processor and a display screen, the method comprising:
    detecting, by the inertial sensor, movement of the device;
    analyzing, by the processor in response to the detected movement, a first image captured by the camera to determine an orientation of a feature of a user of the device relative to an axis of the device;
    comparing the determined orientation of the user feature to an orientation of the user feature determined by analyzing a second image captured by the camera before the detecting of the movement of the device; and
    displaying, by the display screen, a user interface in a display mode selected from at least one of a landscape mode or a portrait mode based on the comparing.

18. The non-transitory storage medium of claim 17, wherein the analyzing includes determining an orientation of a line connecting eyes of the user in the first image.

19. The non-transitory storage medium of claim 17, wherein the determined orientation of the line is an angle of the line relative to the axis of the device.

20. The non-transitory storage medium of claim 17, further comprising detecting at least one of a face of the user or eyes of the user in the first image.

21. The non-transitory storage medium of claim 17, wherein the displaying includes maintaining, after the detecting of the movement, a display mode existing immediately prior to the detected movement if the determined orientation changes in comparison to the orientation of the user feature determined by analyzing the second image captured by the camera before the detecting of the movement by less than a threshold amount.

22. The non-transitory storage medium of claim 17, wherein the displaying includes switching, after the detecting of the movement, a display mode existing immediately prior to the detected movement if the determined orientation changes in comparison to the orientation of the user feature determined by analyzing the second image captured by the camera before the detecting of the movement by more than a threshold amount.

23. A method for use in a portable electronic device having a camera, an inertial sensor, a processor and a display screen, the method comprising:
capturing a first image of a user using the camera;
detecting, by the inertial sensor, movement of the device after capturing the first image;
capturing a second image of the user in response to the detecting of the movement;
displaying, by the display screen, a user interface in a display mode selected from at least one of a landscape mode or a portrait mode as a function of the captured first and second images of the user.

24. The method of claim 23, wherein the displaying displays the user interface in the selected display mode as a function of comparing an orientation of a user feature determined by analyzing the second image to an orientation of the user feature determined by analyzing the first image.

25. The method of claim 23, wherein the displaying maintains, after the detecting of the movement, a display mode existing immediately prior to the detected movement if an orientation of a user feature determined by analyzing the second image changes in comparison to an orientation of the user feature determined by analyzing the first image by less than a threshold amount.

26. The method of claim 23, wherein the displaying switches from, after the detecting of the movement, a display mode existing immediately prior to the detected movement to a different display mode if an orientation of a user feature determined by analyzing the second image changes in comparison to an orientation of the user feature determined by analyzing the first image by more than a threshold amount.

27. A portable electronic device, comprising:
a camera;
an inertial sensor;
a display screen; and
a processor, wherein the processor is configured to control the camera, inertial sensor, and display to:
capture a first image of a user using the camera;
detect, by the inertial sensor, movement of the device after capturing the first image;
capture a second image of the user in response to the detecting of the movement; and
display, by the display screen, a user interface in a display mode selected from at least one of a landscape mode or a portrait mode as a function of the captured first and second images of the user.

28. The portable electronic device of claim 27, wherein the displaying displays the user interface in the selected display mode as a function of comparing an orientation of a user feature determined by analyzing the second image to an orientation of the user feature determined by analyzing the first image.

29. The portable electronic device of claim 27, wherein the displaying maintains, after the detecting of the movement, a display mode existing immediately prior to the detected movement if an orientation of a user feature determined by analyzing the second image changes in comparison to an orientation of the user feature determined by analyzing the first image by less than a threshold amount.

30. The portable electronic device of claim 27, wherein the displaying switches from, after the detecting of the movement, a display mode existing immediately prior to the detected movement to a different display mode if an orientation of a user feature determined by analyzing the second image changes in comparison to an orientation of the user feature determined by analyzing the first image by more than a threshold amount.

31. A non-transitory storage medium having program instructions, which when executed by a processor perform a method for use in a portable electronic device having a camera, an inertial sensor, the processor and a display screen, the method comprising:
capturing a first image of a user using the camera;
detecting, by the inertial sensor, movement of the device after capturing the first image;
capturing a second image of the user in response to the detecting of the movement;
displaying, by the display screen, a user interface in a display mode selected from at least one of a landscape mode or a portrait mode as a function of the captured first and second images of the user.

32. The non-transitory storage medium of claim 31, wherein the displaying displays the user interface in the selected display mode as a function of comparing an orientation of a user feature determined by analyzing the second image to an orientation of the user feature determined by analyzing the first image.

33. The non-transitory storage medium of claim 31, wherein the displaying maintains, after the detecting of the movement, a display mode existing immediately prior to the detected movement if an orientation of a user feature determined by analyzing the second image changes in comparison to an orientation of the user feature determined by analyzing the first image by less than a threshold amount.

34. The non-transitory storage medium of claim 31, wherein the displaying switches from, after the detecting of the movement, a display mode existing immediately prior to the detected movement to a different display mode if an orientation of a user feature determined by analyzing the second image changes in comparison to an orientation of the user feature determined by analyzing the first image by more than a threshold amount.

* * * * *